3,793,260
THERMOSETTING MOLDING COMPOSITION COMPRISING HIGH VINYL BUTADIENE POLYMER
Peter Henry Westermann, Dorking, England, assignor to BP Chemicals Limited, London, England
No Drawing. Filed July 20, 1971, Ser. No. 164,421
Claims priority, application Great Britain, July 27, 1970, 36,295/70
Int. Cl. C08f 15/02, 15/40
U.S. Cl. 260—879                                                4 Claims

ABSTRACT OF THE DISCLOSURE

Thermosetting moulding compositions comprising high vinyl butadiene polymer, a free radical initiator and an acrylamide compound having the general formula $$H_2C{:}CR^1CONHR^2$$

wherein $R^1$ is hydrogen or an organic hydrocarbon substituent and $R^2$ is hydrogen or an organic substituent have improved rates of cure and the thermoset products have good flexural strength. The preferred acrylamide compounds are acrylamide itself, methacrylamide, N-phenyl acrylamide and N,$N^1$-methylene bisacrylamide.

---

The present invention relates to thermosetting moulding compositions based on high vinyl butadiene polymers.

Conventional polymers of 1,3-butadiene, for example those produced by free radical aqueous emulsion processes, contain chains of polymerized butadiene units, each unit being chemically bonded to adjacent units in the chain in either the 1 and 2 positions as shown in (a) or the 1 and 4 positions as shown in (b).

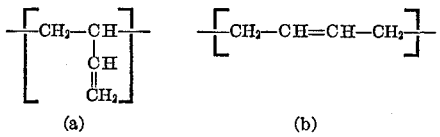

(a)                (b)

Generally, free radical emulsion polymerization tends to give butadiene polymer containing mainly the 1,4-bonded units and relatively few 1,2-bonded units. Butadiene polymers and copolymers containing more than about 25% of the 1,2-bonded units are known as high vinyl butadiene polymers and can be made, for example, by alkali metal catalyzed polymerization. High vinyl butadiene polymers are known to have useful thermosetting properties.

By a thermosetting moulding composition is meant throughout this specification a composition which can be fabricated into hard infusible shaped articles by the action of heat and pressure, for example by pressing in a heated mould. Examples of such thermosetting moulding compositions are filled or unfilled compositions, reinforcement in preimpregnated form and preformed moulding compositions.

Among the fillers that can be used are inorganic fillers for example various types of carbon blacks, silicas, aluminas, and calcium silicate, titanium dioxide, zinc sulphide, calcium carbonate, zinc oxide, magnesia and clays, and organic fillers for example coumarone-indene resins, petroleum resins, high styrene resins such as high styrene-low butadiene copolymers, lignins, wood flour, styrene isobutylene resins and phenolic resins.

Suitable reinforcing materials are for example glass and asbestos fibres, woven or non-woven mats and chopped strands.

An object of the present invention is to provide thermosetting moulding compounds having improved properties.

Accordingly the present invention is a thermosetting moulding composition comprising a high vinyl butadiene polymer, a free radical initiator and an acrylamide compound having the general formula $H_2C{:}CRCONHR^1$ wherein R is hydrogen or an organic hydrocarbon substituent and $R^1$ is hydrogen or an organic substituent.

The high vinyl butadiene polymer used in the composition of the present invention preferably contains at least 30% of 1,2-bonded units and most preferably contains at least 65% of 1,2-bonded units. Particularly useful thermosetting moulding compositions can be made using high vinyl butadiene polymer having about 85% of 1,2-bonded units. Suitably the viscosity average molecular weight $\bar{Mv}$ of the polymer is in the range 500 to 500,000 and preferably in the range 1,000 to 200,000, where the viscosity is measured in an Ostwald viscometer using toluene as solvent at 25° C. and the viscosity average molecular weight is calculated from the intrinsic viscosity $(\eta)$ using the following equation.

$$(\eta) = 1.69 \times 10^{-4}\, \bar{Mv}^{0.73}$$

The initiator is suitably an organic peroxidic compound, examples of such compounds being ditertiarybutyl peroxide, tertiarybutylperbenzoate, tertiarybutyl peroctoate, benzoyl peroxide, 1,1-ditertiary butyl peroxy-3,3,5-trimethylcyclohexane, and tertiarybutylperacetate. Useful thermosetting moulding compositions are obtained using dicumyl peroxide, as the initiator and particularly useful thermosetting moulding compositions are obtained using bis(alkyl peroxy) mononuclear aromatic compounds as initiators, the compounds 1,3 or 1,4-bis(tertiarybutyl peroxy isopropyl) benzene particularly preferred. A thermosetting moulding composition comprising a high vinyl butadiene polymer and a free radical initiator comprising a bis (alkylperoxy) mononuclear aromatic compound is described in our British patent application No. 36,294/70, filed July 27, 1970, referred to in the application documents as case CPE 2931 and entitled "Polymer Composition."

Mixtures of initiators can be used if desired.

Concentrations of initiator to be used in the thermosetting moulding compositions are suitably in the range 1 to 10% based on the weight of high vinyl butadiene polymer and are preferably in the range 2 to 7%.

The R substituent in the acrylamide compound is preferably hydrogen or an alkyl group containing from 1 to 6 carbon atoms for example a methyl or ethyl group. The $R^1$ substituent is preferably hydrogen, phenyl or a substituent having the formula $-CH_2NHCOCH{=}CH_2$. The compounds acrylamide, methacrylamide, N-phenylacrylamide and N,$N^1$-methylenebisacrylamide are preferred. Acrylamide is particularly preferred.

Preferably the concentration of the acrylamide compound in the compositions of the present invention is in the range 2 to 50% based on the weight of the high vinyl butadiene polymer and most preferably in the range 5 to 20%.

In one embodiment according to the present invention a polymeric compound capable of reacting with ammonia under the thermosetting conditions is incorporated in the thermosetting composition to increase the degree of crosslinking in the thermoset products. Suitable compounds for incorporating in this manner are for example polyvinyl chloride, chlorinated polyethylene, vinyl chloride/propylene copolymers and polychloroprene. Preferably compounds of this type are used when the $R^1$ substituent in the acrylamide compound is hydrogen. When it is desired to incorporate such compounds capable of reacting with ammonia into the thermosetting moulding compounds of the present invention, they are preferably used in quantities in the range 10 to 100% based on the weight of the acrylamide compound.

The thermosetting moulding compositions of the present invention can contain in addition to the acrylamide compound a monomer or monomers copolymerizable with the high vinyl butadiene polymer, for example styrene, vinyl toluene, diethyl fumarate, diethyl maleate, dibutyl fumarate, allyl methacrylate, glycol dimethacrylate and trimethylol propane trimethacrylate. Polar copolymerizable monomers, for example, diethyl fumarate and allyl methacrylate are particularly suitable comonomers for use with acrylamide, methacrylamide or N,N¹-methylene bis-acrylamide as they act as solvents for these solid compounds. Where such copolymerizable material is incorporated in the composition, the concentration is preferably in the range 5 to 50% based on the weight of high vinyl butadiene polymer.

Shrinkage controllers may be incorporated in the compositions of the present invention if desired to control shrinkage which can occur during the thermosetting process. Examples of such shrinkage controllers are thermoplastic polymers for example low density ethylene homopolymers and copolymers or mixtures of these with high density polyethylene; polystyrene, polyvinyl chloride, poly-N-phenylacrylamide and chlorinated polyethylene; polymeric materials such as rubbery or liquid isobutene polymers; and saturated liquid polymers such as polypropylene adipate, polypropylene sebacate and polypropylene glycol. The preferred shrinkage controllers are ethylene polymers and rubbery or liquid isobutene polymers. Particularly preferred shrinkage controllers are polyisobutenes having a number average molecular weight in the range 1,000 to 100,000, and most preferably in the range 2,000 to 20,000.

A thermosetting moulding composition comprising a polymerizable component comprising a high vinyl butadiene polymer and a free radical initiator and, as a shrink controller, polyethylene comprising an ethylene homopolymer or an ethylene copolymer containing at least 85% of copolymerized ethylene units is described in our British patent application No. 36,296/70, filed July 27, 1970, referred to in the application documents are case CPE 2893 and entitled "Polymer Composition."

When it is desired to incorporate thermoplastic polymers as shrink controllers in the thermosetting moulding compositions of the present invention the preferred concentrations are in the range 5 to 100% based on the weight of the total polymerizable material. When it is desired to incorporate a rubbery or liquid isobutene polymer or a saturated liquid polymer as shrink controller, the preferred concentrations are in the range 1 to 50% based on the weight of high vinyl butadiene polymer, and most preferably in the range 5 to 25%. Useful thermosetting moulding compositions can be made by incorporating polyvinyl chloride as a shrink controller together with a polar copolymerizable monomer for example, diethyl fumarate in the thermosetting moulding compounds of the present invention.

When it is desired to incorporate polystyrene into the composition of the present invention, preferably monomeric styrene is also incorporated at a concentration in the range 100 to 200% based on the weight of the polystyrene.

The various components of the thermosetting moulding compositions of the present invention can be mixed together in any desired order, conventional mixing apparatus being used used if desired. If desired, a diluent for example hexane or toluene can be used to facilitate the mixing of the components and all, or the bulk of the diluent can then be removed under vacuum or by heating to a temperature below about 100° C., preferably under vacuum or in a stream of nitrogen. Heating the composition to temperatures not greater than about 100° C. can also be used to promote better mixing of the components. When glass fibre is used as reinforcement in the composition of the present invention it is preferred to use at least some diluent to facilitate the mixing and to minimize mechanical damage to the fibre.

Where fillers such as glass fibre, silica, quartz or clay are incorporated in the thermosetting moulding compositions of the present invention, adhesion promoting silanes for example vinyl-tris (beta-methoxyethoxy) silane can, if desired, be included to improve the adhesion between the filler and the thermoset components in the thermoset products.

Antioxidants for example butylated hydroxy toluene (BHT) can be incorporated in the thermosetting moulding compositions of the present invention to prolong their shelf life.

The moulding compositions are suitably thermoset at temperatures in the range 140 to 250° C. and at pressures in excess of 100 p.s.i.

The thermosetting moulding compounds of the present invention have improved rates of cure and the thermoset products have good flexural moduli and improved resistance to boiling water. They are useful for making, for example, articles such as pump impellors and mouldings for electrical applications.

The following examples illustrate the preparation and properties of thermosetting moulding compositions wherein Examples 1–6 are according to the present invention and Examples 7 to 10 are by way of comparison.

EXAMPLE 1

85 parts by weight of high vinyl butadiene polymer with $\overline{Mv}=23,000$ and 86% of 1,2 - bonded units, was mixed with 300 parts of calcium carbonate filler, 4 parts of dicumyl peroxide, 0.5 part of butylated hydroxytoluene (BHT) and 15 parts of acrylamide. The temperature of the mix was maintained at 85° C. When a uniform mix had been obtained 75 parts of ¼" chopped glass fibres were added and the whole mass was mixed until the fibres were dispersed.

Test specimens were moulded at 180° C. and approximately 10 tons per sq. inch for 5 minutes. The moulded specimens were tested and the results are shown in the table.

EXAMPLE 2

A thermosetting moulding composition was made up as described in Example 1 from the following ingredients:

|  | Parts |
|---|---|
| High vinyl butadiene polymer (as in Example 1) | 85 |
| Calcium carbonate filler | 300 |
| 1,3 bis (t. butylperoxy isopropyl) benzene | 4 |
| Vinyl-tris (beta-methoxyethoxy) silane | 2 |
| Finely divided polyvinyl chloride sold under the trade name Breon 121 | 15 |
| Acrylamide | 15 |
| ¼" chopped glass fibres | 75 |

Test specimens were moulded at (A) 180° C. and (B) 160° C. at approximately 10 tons/sq. in for 5 minutes and the results are shown in the table.

EXAMPLE 3

A thermosetting moulding composition was made up as described in Example 1 from the following ingredients:

|  | Parts |
|---|---|
| High vinyl butadiene polymer (as in Example 1) | 85 |
| Calcium carbonate filler | 300 |
| 1,3 bis (tertbutylperoxy isopropyl) benzene | 4 |
| Viny-tris (beta-methoxyethoxy) silane | 2 |
| Diethylfumarate | 10 |
| Methacrylamide | 15 |
| ¼" chopped glass fibres | 75 |

Test specimens were moulded at (A) 180° C. and 160° C. for 5 minutes and at approximately 10 tons/sq. in. results are shown in the table.

EXAMPLE 4

A thermosetting moulding composition was made up as described in Example 1 from the following ingredients:

| | Parts |
|---|---|
| High vinyl butadiene polymer ($\bar{M}v$=25,000 and 1,2 content=76%) | 85 |
| Calcium carbonate filler | 300 |
| 1,3 bis (t. butylperoxy isopropyl) benzene | 4 |
| Diethylfumarate | 10 |
| Acrylamide | 7.5 |
| N,N'-methylenebis acrylamide | 7.5 |
| ¼" chopped glass fibres | 75 |

Test specimens of this composition were moulded at 180° C. for 5 minutes at approximately 10 tons/sq. in. Results are shown in the table.

EXAMPLE 5

A theromsetting moulding composition was prepared by mixing together the following ingredients, the mixture being maintained at 85° C.

| | P.b.w. |
|---|---|
| High vinyl butadiene polymer with $\bar{M}v$=15,000 and containing 85% of 1,2-bonded units | 85 |
| $CaCO_3$ filler | 310 |
| Oppanol B10 an isobutene polymer with $\bar{Mn}$=8000 | 20 |
| 1,3-bis (t-butylperoxyisopropyl) benzene | 2.6 |
| 1,1-bis-butylperoxy-3,3,5-triethyl cyclohexane | 2.6 |
| Allylmethacrylate | 10 |
| Acrylamide | 10 |
| ¼" chopped glass fibres | 80 |

Test specimens were moulded at 160° C. for 5 minutes at 10 tons/sq. in. The mouldings were smooth and free of cracks and mould shrinkage was 0.0022 cm./cm.

EXAMPLE 6

A thermosetting moulding composition was made up as described in Example 1 from the following ingredients:

| | P.b.w. |
|---|---|
| High vinyl butadiene polymer with $\bar{M}v$=18,000 and containing 85% of 1,2-bonded units | 85 |
| Alkathene 200 (low density polyethylene commercially available from Imperial Chemical Industries Ltd.) | 40 |
| Calcium carbonate filler | 300 |
| 1,3-bis (t-butylperoxy isopropyl) benzene | 4 |
| Acrylamide | 8 |
| Diethylfumarate | 4 |
| ¼" chopped glass fibres | 75 |

Test specimens were moulded at 160° C. for 5 minutes at 10 tons/sq. in. and the results are shown in the table.

EXAMPLE 7

A thermosetting moulding composition was prepared substantially as described in Example 1 except that no acrylamide compound was used.

| | Parts |
|---|---|
| High vinyl butadiene polymer (as in Example 1) | 100 |
| Calcium carbonate filler | 300 |
| Dicumyl peroxide | 4 |
| ¼" chopped glass fibres | 70 |

Test specimens of this composition were moulded at 180° C. for 5 minutes at approximately 10 tons/sq. in. and the results are shown in the table.

EXAMPLE 8

A thermosetting moulding composition was prepared as described in Example 1 from the following ingredients:

| | Parts |
|---|---|
| High vinyl butadiene polymer (as in Example 1) | 100 |
| Calcium carbonate filler | 300 |
| 1,3 bis (t. butylperoxy isopropyl) benzene | 4 |
| Vinyl-tris (beta methoxyethoxy) silane | 2 |
| ¼" chopped glass fibres | 75 |

Test specimens of this composition were moulded at 180° C. for 5 minutes at approximately 10 tons/sq. in. and the results are shown in the table.

EXAMPLE 9

A thermosetting moulding composition was prepared by mixing together the following ingredients, the mixture being maintained at 85° C.

| | P.b.w. |
|---|---|
| High vinyl butadiene polymer with $\bar{M}v$=15,000 and containing 85% of 1,2-bonded units | 90 |
| Calcium carbonate filler | 300 |
| 1,3-bis (t-butylperoxy isopropyl) benzene | 4 |
| Allylmethacrylate | 10 |
| ¼" chopped glass fibres | 75 |

Test specimens were moulded at 180° C. for 5 minutes at 10 tons/sq. in. Mouldings showed a drastic drop in impact strength after boiling in water for 1 week.

EXAMPLE 10

A thermosetting moulding composition was prepared by mixing together the following ingredients, the mixture being maintained at 85° C.

| | P.b.w. |
|---|---|
| High vinyl butadiene polymer with $\bar{M}v$=15,000 and containing 85% of 1,2-bonded units | 90 |
| Calcium carbonate filler | 300 |
| Hyvis 200 (isobutene polymer) | 20 |
| 1,3-bis (t. butylperoxy isopropyl) benzene | 4 |
| Allylmethacrylate | 10 |
| ¼" chopped glass fibres | 75 |

Test specimens were moulded at 180° C. for 5 minutes at 10 tons/sq. in. Mouldings showed a drastic drop in impact strength after boiling in water for 1 week.

TABLE

| Example number | Flexural modulus, kg. cm.$^{-2}$ | | | Flexural strength, kg. cm.$^{-2}$ | | | Tensile strength, kg. cm.$^{-2}$ | | | Impact strength, kg. cm.$^{-2}$ | | | Mould shrinkage, cm./cm. |
|---|---|---|---|---|---|---|---|---|---|---|---|---|---|
| | At 23° C. | After boiling[1] in water | At 150° C. | At 23° C. | After boiling[1] in water | At 150° C. | At 23° C. | After boiling[1] in water | At 150° C. | At 23° C. | After boiling[1] in water | | |
| 1 | 80,000 | 33,000 | 40,000 | 830 | 390 | 670 | 390 | 280 | 190 | 14 | 12 | | 0.0056 |
| 2(A) | 78,000 | 52,000 | 54,000 | 740 | 820 | 770 | 450 | 320 | 280 | 16 | 14 | | 0.0042 |
| 2(B) | 69,000 | 41,000 | 52,000 | 1,030 | 720 | 900 | NM | NM | NM | 17 | 16 | | 0.0045 |
| 3(A) | 81,000 | 60,000 | 49,000 | 940 | 850 | 870 | 360 | 240 | 270 | 25 | 23 | | 0.0058 |
| 3(B) | 73,000 | 55,000 | 58,000 | 1,260 | 760 | 900 | NM | NM | NM | 20 | 19 | | 0.0042 |
| 4 | 79,000 | 45,000 | 50,000 | 1,270 | 680 | 940 | 480 | 280 | 280 | 18 | 12 | | 0.0037 |
| 5 | 66,000 | 40,000 | 45,000 | 1,000 | 560 | 600 | 450 | 260 | 300 | 18 | 15 | | 0.0022 |
| 6 | 47,000 | 35,000 | 21,000 | 750 | 480 | 660 | 510 | 320 | 330 | 14 | 24 | | 0.0026 |
| 7 | 48,000 | 44,000 | 32,000 | 770 | 390 | 580 | 400 | 240 | 250 | 16 | 11 | | 0.0066 |
| 8 | 58,000 | 46,000 | 44,000 | 960 | 410 | 800 | 315 | 250 | 300 | 14 | 7 | | 0.0032 |
| 9 | 59,000 | 54,000 | 50,000 | 1,000 | 390 | 850 | 470 | 310 | 330 | 20 | 1.6 | | 0.0042 |
| 10 | 58,000 | 54,000 | 40,000 | 910 | 490 | 500 | 500 | 340 | 300 | 16 | 1.6 | | 0.0026 |

[1] Indicates the specimens were boiled in water for 1 week and the physical property measured after cooling to 23° C.

NOTE.—NM indicates that the physical property was not measured.

I claim:

1. A thermosetting moulding composition comprising a high vinyl butadiene polymer, an organic peroxide free radical initiator and from 2 to 50%, by weight of vinyl butadiene polymer, of acrylamide or methacrylamide.

2. A thermosetting moulding composition according to claim 1 wherein the initiator is 1,3 or 1,4-bis (tertiary-butyl peroxy isopropyl) benzene.

3. A thermosetting moulding composition comprising a high vinyl butadiene polymer, an organic peroxide free radical initiator, an acrylamide compound selected from the group consisting of acrylamide and methacrylamide and a copolymerizable monomer selected from diethyl fumarate and allyl methacrylate.

4. A thermoset product comprising a composition according to claim 1 which has been subjected to thermosetting temperature and pressure.

References Cited
UNITED STATES PATENTS

| | | | |
|---|---|---|---|
| 3,026,293 | 3/1962 | Caldwell et al. | 260—879 |
| 3,297,623 | 1/1967 | Knapp et al. | 260—29.7 |
| 3,546,323 | 12/1970 | Hwa et al. | 260—879 |
| 3,652,731 | 3/1972 | Coffey et al. | 260—879 |
| 3,636,141 | 1/1972 | O'Neill et al. | 260—880 R |

JAMES A. SEIDLECK, Primary Examiner
W. F. HAMROCK, Assistant Examiner

U.S. Cl. X.R.

260—41.5 R, 878 R, 880 R